(No Model.) 2 Sheets—Sheet 2.

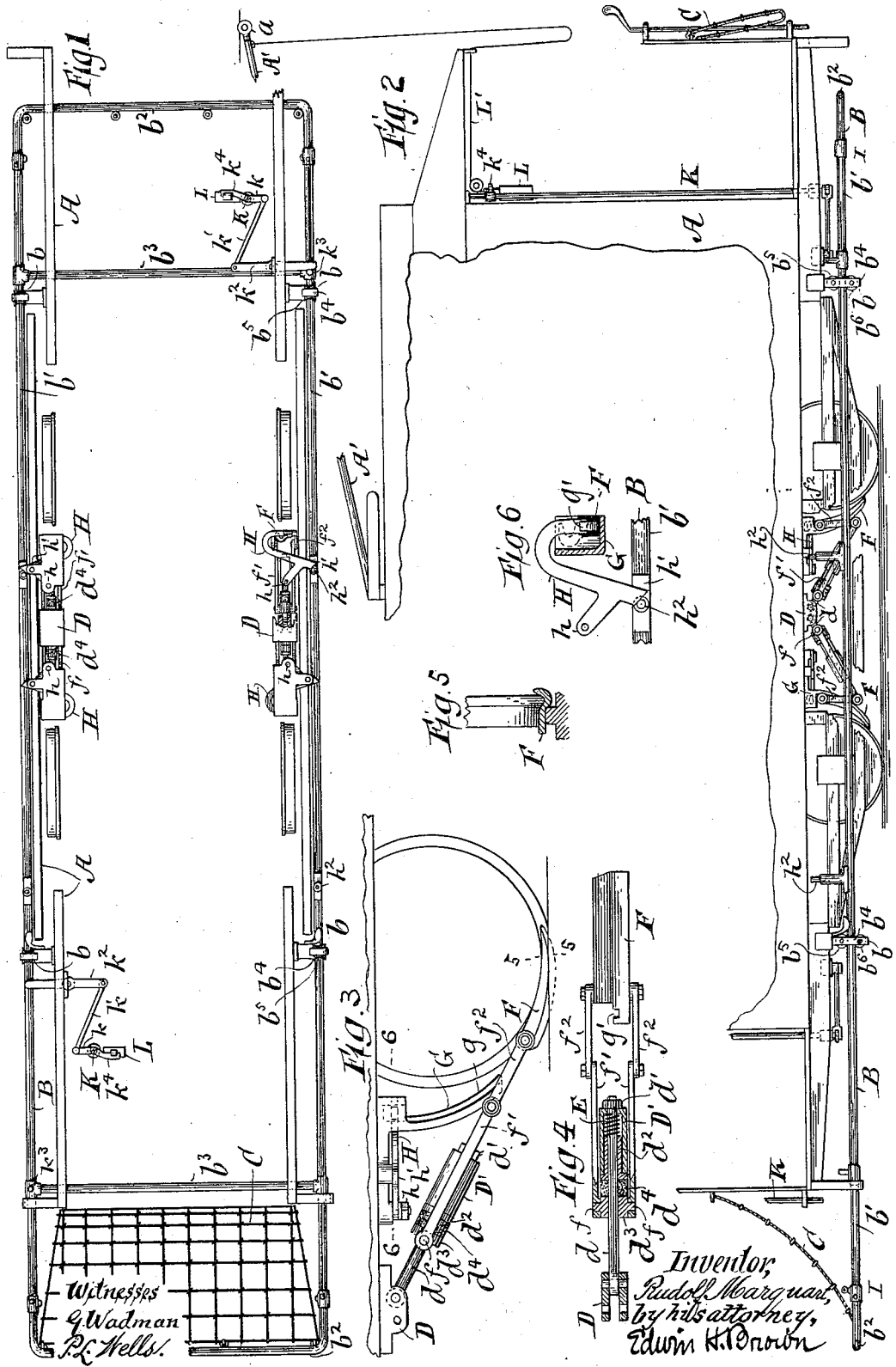
(No Model.) 2 Sheets—Sheet 1.
R. MARQUART.
FENDER AND AUTOMATIC BRAKE MECHANISM.
No. 563,498. Patented July 7, 1896.

R. MARQUART.
FENDER AND AUTOMATIC BRAKE MECHANISM.

No. 563,498. Patented July 7, 1896.

Witnesses
Geo. Wadman
P. L. Wells

Inventor
Rudolf Marquart,
by his attorney,
Edwin H. Brown

UNITED STATES PATENT OFFICE.

RUDOLF MARQUART, OF NEW YORK, N. Y., ASSIGNOR OF TWO-THIRDS TO EUGENE PFISTER, OF SAME PLACE, EDWARD B. TOMPKINS, OF BROOKLYN, AND ROBERT C. FISHER, OF NEW ROCHELLE, NEW YORK.

FENDER AND AUTOMATIC BRAKE MECHANISM.

SPECIFICATION forming part of Letters Patent No. 563,498, dated July 7, 1896.

Application filed September 24, 1895. Serial No. 563,559. (No model.)

*To all whom it may concern:*

Be it known that I, RUDOLF MARQUART, of the city, county, and State of New York, have invented a certain new and useful Improvement in Fender and Automatic Brake Mechanism, of which the following is a specification.

My invention relates to that class of apparatus which is combined with vehicles and designed to be thrown into action by an obstruction in front of the moving vehicle to apply the brakes to the wheels thereof.

I will describe a fender and automatic brake mechanism embodying my improvement, and then point out the novel features in the claims.

Figure 7:
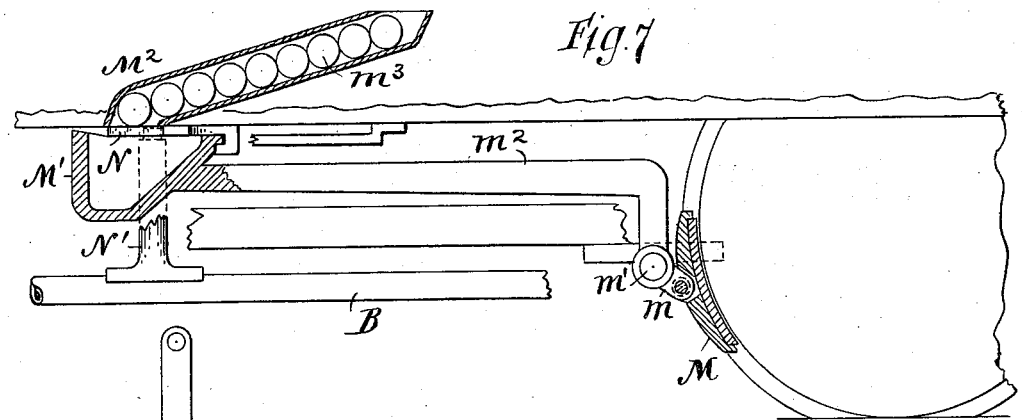
Figure 8:
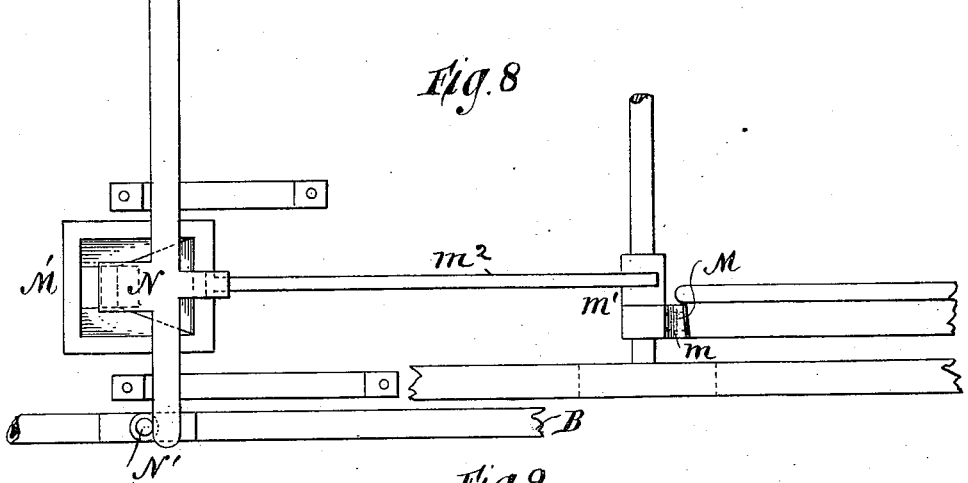
Figure 9:
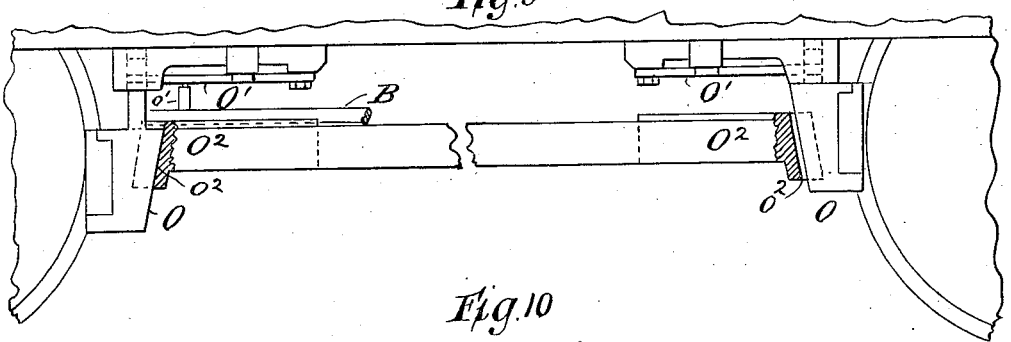
Figure 10:
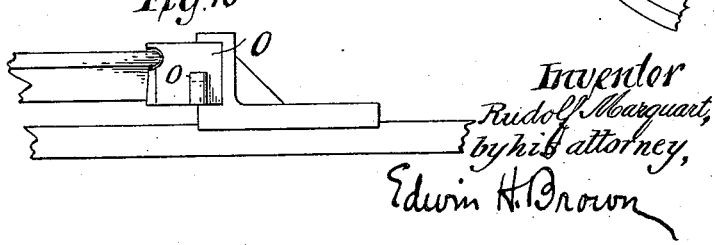

In the accompanying drawings, Figure 1 is a plan view of a fender and automatic brake mechanism applied to a vehicle and embodying my improvement, certain parts being omitted. Fig. 2 is a side elevation of the same. Fig. 3 is an enlarged side elevation of one of the wheels of the vehicle, showing the brake mechanism in a position assumed during its action. Fig. 4 is a plan view of the brake-shoe with the appurtenances thereof in longitudinal section. Fig. 5 is a section on the plane of the line 5 5 of Fig. 3. Fig. 6 is a similar view on the line 6 6 of Fig. 3. Fig. 7 is a view, partly in section and partly in elevation, showing a modified arrangement for applying the brake to the wheel of the vehicle. Fig. 8 is a plan view of the construction shown in Fig. 7. Fig. 9 is a side elevation of still another modification. Fig. 10 is a plan view of a fragment of the same.

Similar letters of reference designate corresponding parts in all figures.

Referring first to the form of my invention embodied in the construction illustrated in Figs. 1, 2, 3, 4, 5, and 6, the vehicle is designated by A. A portion of the same only is shown. The vehicle may consist of an electrically-propelled car, and I have so represented it, showing at A' the usual swinging arm supporting the trolley $a$, which slides or rolls along the conductor. The motors and other accessories for the propulsion of the car I have not deemed it necessary to show.

B is a movable frame supported beneath the car in bearings $b$, extending from the body thereof and fitted therein to permit of a sliding movement lengthwise of the car. The frame is shown to be rectangular in outline, comprising longitudinal bars $b'\ b'$, and transverse end bars $b^2\ b^2$, while strengthening cross-bars $b^3\ b^3$ are also supplied. Preferably the supports $b$ will comprise straps $b^4$, in each of which there are journaled an upper and a lower roller $b^5$ and $b^6$, respectively, between which the longitudinal bars $b'\ b'$ slide, and by which the frame is confined to a strictly-longitudinal movement.

The length of the frame B will be such that when extended to the limit of its movement the transverse bar $b^2$ at one end will project a short distance in front of the advancing end of the car, while the opposite end will be situated close to the rear end of the car.

C is a flexible sheet, for instance woven wire, attached at opposite ends to the front of the car and to the transverse bar $b^2$ to receive an object falling toward the car.

I will now describe the mechanism thrown into operation by means of the movable frame B.

The brake mechanism according to the present improvement is situated between two adjacent wheels of the car on each side of the same and embodies two constructions which are duplicates of each other. During the movement of the car in one direction, only one of these mechanisms on each side of the car is in a position to be thrown into action by the backward movement of the frame B, and it is that mechanism connected with the brake-shoe which for the time being constitutes the rear brake-shoe. Evidently if this shoe is pressed down between the tread of the wheel and the track the tendency of the former will be to roll up on the same and scotch or lift the wheel from the track.

D is a block attached preferably to the body of the car at that portion of the same lying between two adjacent wheels as viewed from the side of the car. There is a block D for each side of the car, and the mechanism about to be described will also be duplicated for each side of the same.

Pivoted to the block D at opposite sides thereof is a rod $d$, each rod extending toward the adjacent wheel and being provided at its free extremity with a nut or boss $d'$, forming an abutment or stop for a cylinder or barrel $D'$. The rod $d$ extends through the cylinder and the latter is closed at one end to abut against the stop $d'$, while at its opposite end it is open to receive a piston $d^2$. The piston $d^2$ is provided with a head $d^3$, there being preferably interposed between the piston $d^2$ and the head $d^3$ a block $d^4$, of compressible material, as rubber. The rod $d$ extends through an opening in the piston $d^2$, block $d^4$ and head $d^3$ sliding freely through this opening.

E is a helical spring coiled around the rod $d$, abutting at its ends against the bottom of the cylinder $D'$ and the end of piston $d^2$.

The brake-shoe F is in connection with the head $d^3$ through a system of links arranged as follows: From the head $d^3$ extend transverse pivot-pins $f$ from diametrically opposite sides thereof, to each of which is pivoted a side link $f'$. At its opposite end each link $f'$ is pivoted to a second link $f^2$, the latter in turn at its remaining end being pivoted to a stud extending from the shoe F.

The brake-shoe F in cross-sectional outline conforms preferably to the tread of the wheel as well as the flange thereof, as shown in Fig. 5. Longitudinally it is curved and tapers gradually from that end in engagement with the two links $f^2$ to the opposite end, where it is more or less sharpened.

G is a support for the shoe F while the same is not in action. It is extended at $g$ in the form of a guide for directing the movement of the shoe as it descends when released. The system of supporting-links already described will permit the elevation of the shoe to its upper position, as well as permitting the free downward movement of the same.

A notch $g'$ is formed in the body of each shoe at its upper extremity, with which notch engages a latch H, pivoted at $h$, preferably to the car-body, so that its free end may be inserted in the notch $g'$ when the shoe is at its highest position. A movement of the pivoted latch H when so inserted will withdraw its extremity from the notch $g'$ and permit the shoe to fall. Each latch is provided with an extension, (shown at $h'$,) having a beveled edge adapted to coact with a stud $h^2$, extending upward from the side bars $b'$ of the frame B and carried along with the frame when the same is slid in its support to swing the latch H and release the shoe F. Upon its release by the movement of the frame B the shoe at each side of the car descends along its respective guide $g$, being directed thereby toward and into the space between the periphery of the wheel and the track, resulting in the elevation of the wheel above the track, the spring E and compressible block $d^4$ precluding this action from being too violent. Upon a reversal in the direction of motion of the car the frame B is moved forward to the opposite end of its movement and the brake mechanism, which is now the rear one, put into operative position.

Stops I may be secured to the frame B to limit its lengthwise movement.

I have also shown in the drawings a construction for withdrawing the trolley $a$ from contact with the conductor, this withdrawal being likewise effected by the movement of the frame B, due to an obstruction in the path of the moving vehicle.

K is an upright shaft at each end of the car, journaled in suitable supports. At its lower extremity an arm $k$ is rigidly secured to it. The outer end of the arm $k$ is connected by a link $k'$ with one end of a double-armed lever $k^2$, pivoted, for instance, to the body of the car. The outer end of the double-armed lever $k^2$ protrudes into the path of a stud or pin $k^3$, projecting from the frame B.

At its upper extremity the upright shaft is provided with a second arm $k^4$, acting as a latch, since it extends at its free end into a notch provided in a suspended weight L. The weight L is connected with a rope or cord $L'$, extending over suitable guide-pulleys or the like to the outer edge of the car-bonnet and thence upward to the pole $A'$, a suitable loop being left in the cord to provide for the variation in the height of the conductor. It is evident from this construction that upon a backward movement of the frame B, due to an impingement of the same against an object in the path of the car, simultaneously with the application of the brakes, or even before if the stop $k^3$ is properly positioned, the weight L will be released and the trolley drawn away from the conductor, thus shutting off the power.

Referring now to the modification shown in Figs. 7 and 8, B is, as before, the movable frame, as already described. M is a brake-shoe pivoted to the short arm $m$ of a double-armed lever pivoted at $m'$ to the body or truck of the car. $M'$ is a receiver or vessel supported at the free end of the long arm $m^2$ of the lever. Arranged within the car and having an opening located immediately above the receiver $M'$ is a receptacle $M^2$, in which are held a number of movable weights $m^3$. These weights may be in the form of balls or disks. N is a cover in the form of a pivoted lever for the opening of the receptacle $M^2$, movable toward and away from the same to cover or to uncover the opening. A post $N'$ is rigidly secured to the frame B, into the path of which the lever constituting the cover N extends that it may be shifted. The cover N constitutes in effect a latch for controlling the movement of the weights $m^3$. Normally the cover N is over the opening of the receptacle $M^2$, and the weights $m^3$ are held therein. If, however, the frame B moves, the cover is shifted away from the opening, and the weights fall into the receiver $M'$, applying the brakes with constantly-increasing force as they successively enter the receiver.

Referring now to the construction exemplified by Figs. 9 and 10, B is, as before, the moving frame. Each brake-shoe O at its upper portion is provided with an extension having a notch $o$, within which fits the end of the pivoted latch O', swung upon its pivot to release the shoe by the stud $o'$, as already described. The rear edge of each shoe O is inclined to the perpendicular and fits against a similarly-inclined surface $o^2$, formed at the extremity of a rigid support $O^2$. Consequently when the shoe is released by the movement of the frame B it will fall and wedge in between the periphery of the wheel and the inclined surface $o^2$ to effectually retard the rotation of the wheel. Of course that brake-shoe will be in operative connection with the stud $o'$, the corresponding wheel of which is moving in such a direction as to cause the shoe to be urged downward.

Having described my invention, what I consider as new, and desire to secure by Letters Patent, is—

1. The combination with a vehicle, of a movable frame extending lengthwise thereof, and adapted to be adjusted toward either end of the vehicle corresponding with the direction of its movement, brake mechanism for the vehicle, a latch piece, or pieces, for normally holding the brake mechanism in an inoperative position, and pins, or studs upon the movable frame for moving said latch piece, or pieces to permit the brake mechanism to operate, substantially as specified.

2. The combination with a vehicle, of a movable frame extending lengthwise thereof, and adapted to be adjusted toward either end of the vehicle corresponding with the direction of its movement, brake-shoes carried by the vehicle and movable toward and away from the wheels, latch-pieces normally holding the brake-shoes away from the wheels, and means carried by said frame for moving said latch-pieces and permitting the movement of the brake-shoes, substantially as specified.

3. The combination with a vehicle, of a movable frame, brake-shoes carried by the vehicle and movable toward and away from the wheels, a weight for causing the disengagement of a device supplying power to the vehicle, as a moving conductor from a stationary conductor, latch-pieces for holding said weight elevated, and the brake-shoes away from the wheels, and means carried by said frame for moving said latch-pieces and permitting the descent of the weight and the movement of the brake-shoes, substantially as specified.

4. The combination with a vehicle, of a brake-shoe, a guide therefor adjacent to the vehicle-wheel, a series of links connecting said brake-shoe with the vehicle, a latch for normally holding the brake-shoe elevated and a movable frame for tripping the latch, substantially as specified.

5. The combination of the movable frame B, the rod $d$ pivoted to a fixed portion of the vehicle and extending toward a wheel thereof, the cylinder or barrel D', the piston $d^2$, the spring E interposed between the piston and cylinder-head, the side links $f' f'$ pivoted to the piston, the brake-shoe F and the links $f^2, f^2$ connecting the links $f', f'$ with the shoe F, substantially as specified.

In testimony whereof I have signed my name to this specification in the presence of two subscribing witnesses.

RUDOLF MARQUART.

Witnesses:
W. LAIRD GOLDSBOROUGH,
PIERSON L. WELLS.